Patented Mar. 6, 1951

2,543,817

UNITED STATES PATENT OFFICE 2,543,817

PHOTOCHEMICAL OXIDATION OF NICOTINE

Leopold Weil, Philadelphia, Pa., assignor to United States of America as represented by the Secretary of Agriculture No Drawing. Application July 2, 1948, Serial No. 36,798

4 Claims. (Cl. 204—158)

(Granted under the act of March 3, 1883, as amended April 30, 1928; 370 O. G. 757)

This application is made under the act of March 3, 1883, as amended by the act of April 30, 1928, and the invention herein described and claimed, if patented in any country, may be manufactured and used by or for the Government of the United States of America for governmental purposes throughout the world without the payment to me of any royalty thereon.

This invention relates to photochemical oxidation of organic nitrogenous compounds, particularly to the photochemical oxidation of nicotine, and has among its objects the provision of new compositions of matter and processes for their preparation.

I have found that organic nitrogen-containing compounds combine with oxygen to yield oxygen-containing derivatives, on exposure to light and oxygen in the presence of a hydrogen acceptor such as a thiazine dye. The organic nitrogen compounds which undergo photochemical oxidation under such conditions include, for instance, amines like trimethyl, triethyl, tripropyl, tributyl amine and triethanolamine; alkaloids like atropine, homatropine, physostigmine, hyoscyamine, scopolamine, sparteine, lobeline, arecoline, pilocarpine, hordenine, hydrastine, nicotine, and N-substitution products of nornicotine like N-octyl nornicotine, N-dodecyl nornicotine, and N-octadecyl nornicotine; nitrogenous vitamins, like thiamin and pyridoxin; amino acids, like tryptophane, histidine, cysteine, menthionine; and proteins such as casein, egg albumin, zein, gelatine and crystalline insulin.

I have further found that on photochemical oxidation in the presence of light and a thiazine dye such as methylene blue, methylene green (1924 color index #924), toluidine blue (C. I. #925), new methylene blue (C. I. #927), or thionine (C. I. #926), nicotine combines with an equimolar amount of oxygen and is converted to a compound corresponding to the molecular formula $(C_{10}H_{14}N_2O_2)_2$.

According to the invention, a process is provided which involves oxidizing an organic nitrogen-containing compound, preferably an alkaloid such as nicotine, in an aqueous solution containing a thiazine dye, preferably methylene blue, with oxygen, preferably gaseous oxygen, under irradiation by light and at a temperature from about 10° C. up to below the boiling point of the solution. Under these conditions absorption of oxygen takes place which in the absence of light comes to a standstill. The effective wave length of irradiation (about 6700 Å.) coincides with the maximum absorption of methylene blue and under the conditions of the reaction the light activated dye is converted to the leuco form which continuously undergoes reoxidation and thus serves as a hydrogen acceptor. Upon completion of the reaction, the product resulting from the photochemical oxidation of nicotine, which has the formula $(C_{10}H_{14}N_2O_2)_2$ and a specific rotation $([a]_D^{20})$ of $-35.2°$ in aqueous solution, can be recovered from the reaction mixture by any suitable means, as for instance by evaporation of the solution and solvent extraction. The product thus obtained is useful as a tobacco modifying agent and as an intermediate in chemical syntheses.

The following example is given as an illustrative embodiment of a manner in which the method of this invention can be carried out in practice.

A solution of 20 g. nicotine base and 0.080 g. methylene blue in 500 cc. water was placed in a 2800 cc. Fernbach type fermentation flask fitted with a rubber stopper and provided with a gas inlet tube, a pressure release outlet with a glass stopcock, a mercury manometer, and a mechanical stirring device. The flask was immersed in a glass jar filled with water which was maintained at a temperature of about 40° C. White light of high intensity emitted by a 300 watt "spotlight" lamp, located under the water bath, was projected vertically on the bottom of the flask. The gas inlet tube was connected to an oxygen holder from which the gas was displaced at such a rate as to maintain the gas pressure within the flask, during the oxidation process, slightly above atmospheric pressure. The irradiated solution was thus oxidized at about 40° C. for 7–8 hours until an amount of oxygen approximately equimolar to the nicotine in the solution had been absorbed and the rapid uptake of the gas had ceased. The solution was then transferred to a distillation flask and the methylene blue removed by adding 1 g. of activated charcoal to the solution, boiling the mixture under reduced pressure at about 50° C. for 5–10 minutes and filtering. The filtrate was evaporated in vacuo at about 50° C. and the residue extracted with ether to remove traces of nicotine.

The product so obtained was a yellow viscous material which was practically insoluble in ether, but soluble in chloroform polar solvents and in water. Elementary analysis and molecular weight determination indicated that this product has a composition corresponding to the formula $$(C_{10}H_{14}N_2O_2)_2$$

Qualitative tests for aldehyde, keto, and alcohol groups were negative. The compound is not identical with oxy-nicotine; it is optically active and in aqueous solution has a specific rotation ($[\alpha]_D^{20}$) of $-35.2°$.

Analogous results were obtained in a number of experiments conducted essentially as described in the foregoing example, as well as using an adaptation of the monometric techinque of Warburg and Negelein (1923 Z. physik. Chem. 106, 191). When the latter procedure was used white light of high intensity was passed horizontally through the glass wall of the water bath and reflected on the bottom of the reaction vessel by a mirror placed at 45° under the respirometers. The nicotine solution was placed in the main chamber and a solution of methylene blue in the side arm. After filling the vessel with the oxygen and dumping the dye solution into the main chamber the oxygen uptake was measured in the usual fashion at the desired water bath temperature.

Experiments conducted by either of the two above-described methods, under varying conditions of temperature and concentration, showed that photochemical oxidation of nicotine by the method of this invention can be effected using oxygen or air as the oxidant, at temperatures from about 10° C. up to just below the boiling point of the solution, the rate of the reaction being accelerated by increasing temperature. Although the process can be conducted using aqueous solutions containing 6 g. or more of nicotine base per 100 cc. solution it is usually advantageous to utilize solutions containing from 0.25 g. to about 4 g. nicotine per 100 cc. of solution since at higher concentrations the process is less efficacious. The optimum amount of methylene blue is from about 0.016 g. to 0.020 g. per 100 cc. of solution. When less dye is used the rate of reaction decreases, whereas at higher concentration of the dye the progressively stronger coloration of the solution correspondingly decreases the activating effect of the light.

Having thus described my invention, I claim:

1. A process comprising oxidizing an alkaloid in an aqueous solution containing a thiazine dye with gaseous oxygen under irradiation by light and at a temperature from about 10° C. up to below the boiling point of the solution.

2. A process comprising oxidizing nicotine in an aqueous solution containing a thiazine dye with gaseous oxygen under irradiation by light and at a temperature from about 10° C. up to below the boiling point of the solution to produce a compound having the formula $(C_{10}H_{14}N_2O_2)_2$ and having a specific rotation ($[\alpha]_D^{20}$) of $-35.2°$ in aqueous solution.

3. The process of claim 2 wherein the thiazine dye is methylene blue.

4. A process comprising oxidizing nicotine in an aqueous solution containing methylene blue with gaseous oxygen under irradiation by light and at a temperature from about 10° C. up to below the boiling point of the solution to produce a compound having the formula $(C_{10}H_{14}N_2O_2)_2$ and having a specific rotation ($[\alpha]_D^{20}$) of $-35.2°$ in aqueous solution, said nicotine and methylene blue being present in the proportion of from about 0.25 to 4 grams of nicotine and from about 0.016 to 0.020 grams of methylene blue, respectively, per 100 cc. of solution.

LEOPOLD WEIL.

REFERENCES CITED

The following references are of record in the file of this patent:

UNITED STATES PATENTS

| Number | Name | Date |
| --- | --- | --- |
| 1,926,035 | Chesley | Sept. 12, 1933 |
| 2,225,756 | Pincussen | Dec. 24, 1940 |
| 2,321,823 | Kirkbride | June 15, 1943 |
| 2,341,288 | Pruckner | Feb. 8, 1944 |
| 2,432,642 | Woodward et al. | Dec. 16, 1947 |

OTHER REFERENCES

Weil, Science, vol. 107 (April, 1948), pp. 426–7.
Frankenburg, Science, vol. 107 (April, 1948), pp. 427–8.
Lieberman et al., Beilstein, vol. 7, pp. 663.
Grishkun et al., Chemical Abstracts, vol. 40 (1946), p. 522.
Pepkowitz, Chemical Abstracts, vol. 38 (1944), p. 6306.